United States Patent [19]
Yanagawa

[11] Patent Number: 5,483,512
[45] Date of Patent: Jan. 9, 1996

[54] OPTICAL INFORMATION RECORDING/REPRODUCING DEVICE

[75] Inventor: Naoharu Yanagawa, Tokorozawa, Japan

[73] Assignee: Pioneer Electronic Corporation, Tokyo, Japan

[21] Appl. No.: 223,212

[22] Filed: Apr. 5, 1994

[30] Foreign Application Priority Data

Apr. 9, 1993 [JP] Japan .................................. 5-082953

[51] Int. Cl.$^6$ .................................................. G11B 7/00
[52] U.S. Cl. ........................ 369/54; 369/116; 369/44.32
[58] Field of Search .............................. 369/54, 58, 50, 369/116, 44.32, 44.33, 44.14

[56] References Cited

U.S. PATENT DOCUMENTS 5,181,194  1/1993  Horie ................................ 369/44.33
5,351,225  9/1994  Ishida et al. ....................... 369/44.32
5,412,640  5/1995  Füldner et al. ..................... 369/44.32

*Primary Examiner*—Georgia Y. Epps
*Assistant Examiner*—P. W. Huber
*Attorney, Agent, or Firm*—Kane, Dalsimer, Sullivan, Kurucz, Levy, Eisele and Richard

[57] ABSTRACT

A device for recording information on a recordable optical disk includes: an optical pickup provided with laser unit for emitting and irradiating a laser beam onto the optical disk; radial tilt detecting unit for detecting tilt quantity of the optical disk in a radial direction thereof; tangential tilt detecting unit for detecting tilt quantity of the optical disk in a tangential direction thereof; radial tilt correcting mechanism for moving the pickup on the basis of the radial tilt quantity to correct the radial tilt; and tangential tilt correcting unit for controlling the power of the laser beam on the basis of the tangential tilt quantity.

13 Claims, 16 Drawing Sheets

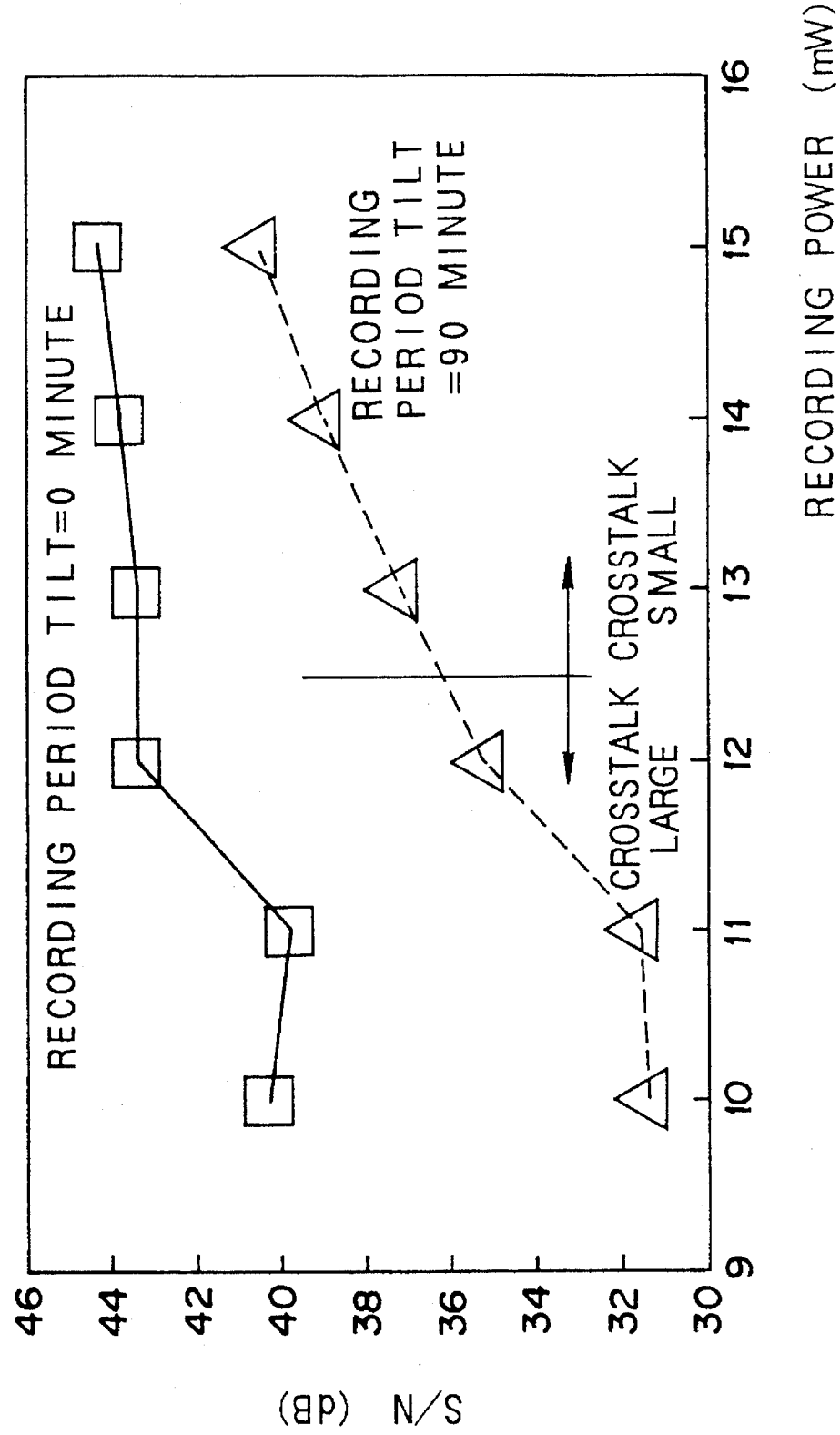

TANGENTIAL DIRECTION T

OPTICAL INFORMATION RECORDING/REPRODUCING DEVICE

BACKGROUND OF THE INVENTION

1. Field of the Invention

This invention relates to an optical information recording/reproducing device, and more particularly to a device which records information onto a recordable optical disk and reproduces information therefrom.

2. Description of the Prior Art

There is known a Write Once Read Many (WORM) type optical disk and a Rewritable type optical disk as a recordable optical disk on which user can arbitrarily record information. In general, dye-type or metal-type disk are used as a Write Once Read Many type optical disk and magnetos-optical disk or phase-change type disk are used as a Rewritable optical disk. Onto these disks information is recorded by irradiating a laser beam on a surface thereof so that information pits are formed by heat corresponding to power of the irradiated laser beam. Therefore, in order to accurately record information, it is very important to optimize the power of the laser beam. In view of this, various measures has been taken to optimize the power of the recording laser beam in compliance with reflectivity of virgin disk, linear velocity of disk rotation, and so on. For instance, CD-R (Recordable Compact Disk) is provided with an area used for power calibration at innermost circumference thereof, and an optimum recording power is determined after test recordings are performed therein. Alternately, in the case of optical memory disk, margin of suitable recording power has been preset and center value of the margin is determined as optimum recording power.

However, decisions of optimum recording power as described above are premised on the assumption that recording is conducted for every portion of the disk under an identical condition. Accordingly, if recording condition is varied by some reasons and actual recording is performed under a condition different from the condition at the time of decision of the optimum recording power, actual recording power is not necessarily optimum. As a result, information pits are formed insufficiently and accuracy of reproduced signal is deteriorated. Curvature, distortion and tilt of disk (hereinafter referred to as "disk tilt") are factors raising such variation of optimum recording power. Namely, when disk tilt exists, laser beam includes aberration and is not uniformly applied onto the surface of the disk, resulting in insufficient formation or deformation of information pits. In the case of read-only type optical disk, such problems rarely take place because, in mass production, information is recorded under detailed management of both recording device and optical disk, and quality of disk produced are carefully examined before being put on a market. However, in the case of recordable optical disk onto which user arbitrarily record information, recording is performed by various recording devices and conditions of optical disks are severally different. Therefore, deformation or insufficient formation of the information pits resulting from the disk tilt probably raises erroneous recording of information.

SUMMARY OF THE INVENTION

It is an object of the present invention to provide an optical information recording/reproducing device which forms appropriate information pits on a recordable optical disk even when the disk is tilted, and accurately records and reproduces information.

According to one aspect of the present invention, there is provided a device for recording information on a recordable optical disk including: laser unit for emitting and irradiating a laser beam onto the optical disk; tilt detecting unit for detecting a tilt quantity of the optical disk in a tangential direction thereof; and laser power control unit for controlling the power of the laser beam on the basis of the tilt quantity detected by the tilt detecting unit.

According to another aspect of the present invention, there is provided a device for recording information on a recordable optical disk including: an optical pickup provided with laser unit for emitting and irradiating a laser beam onto the optical disk; radial tilt detecting unit for detecting tilt quantity of the optical disk in a radial direction thereof; tangential tilt detecting unit for detecting tilt quantity of the optical disk in a tangential direction thereof; radial tilt correcting mechanism for moving the pickup on the basis of the radial tilt quantity to correct the radial tilt; and tangential tilt correcting unit for controlling the power of the laser beam on the basis of the tangential tilt quantity.

According to another aspect of the present invention, there is provided a device for recording information on a recordable optical disk including: an optical pickup provided with laser for emitting and irradiating a laser beam onto the optical disk; radial tilt detecting unit for detecting tilt quantity of the optical disk in a radial direction thereof; tangential tilt detecting unit for detecting tilt quantity of the optical disk in a tangential direction thereof; operation unit for calculating scholar value of tilt quantity on the basis of the quantity of radial tilt and the quantity of tangential tilt; and tilt correcting unit for controlling the power of the laser beam on the basis of the scholar value calculated.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIG. 2A is a diagram illustrating a relation between recording power and S/N ratio;

DESCRIPTION OF THE PREFERRED EMBODIMENT

[I] Theory of the invention

Firstly, as a theoretical premise of the present invention, the relation between optimum recording power and disk tilt quantity will be described.

Figure 1A:
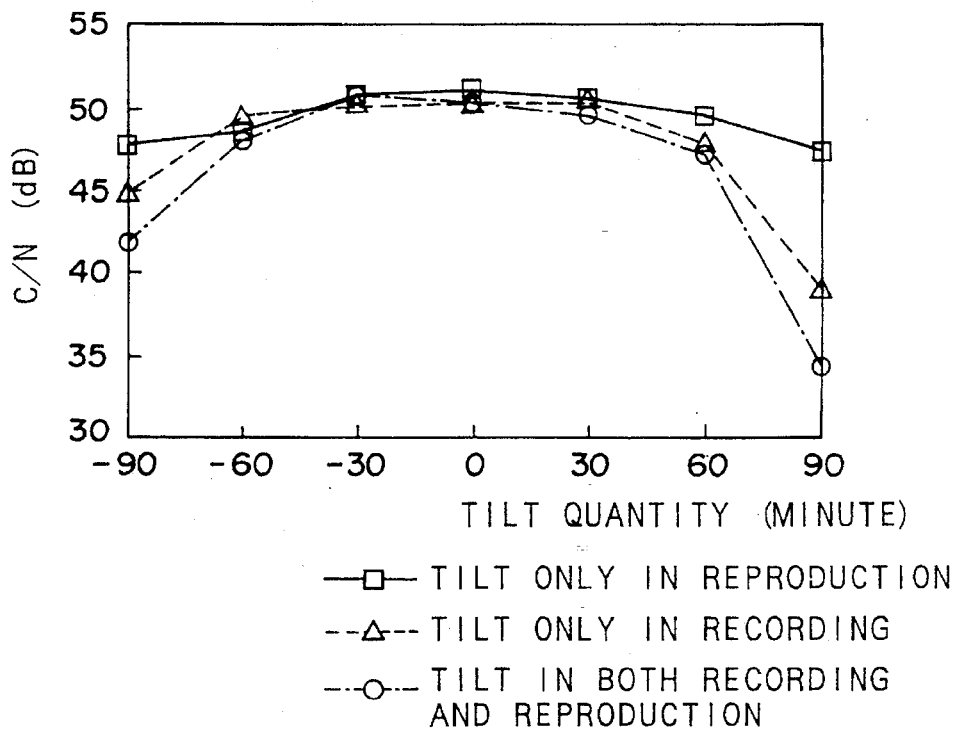
FIG. 1A is a diagram illustrating a relation between disk tilt quantity and C/N ratio.
Figure 1B:
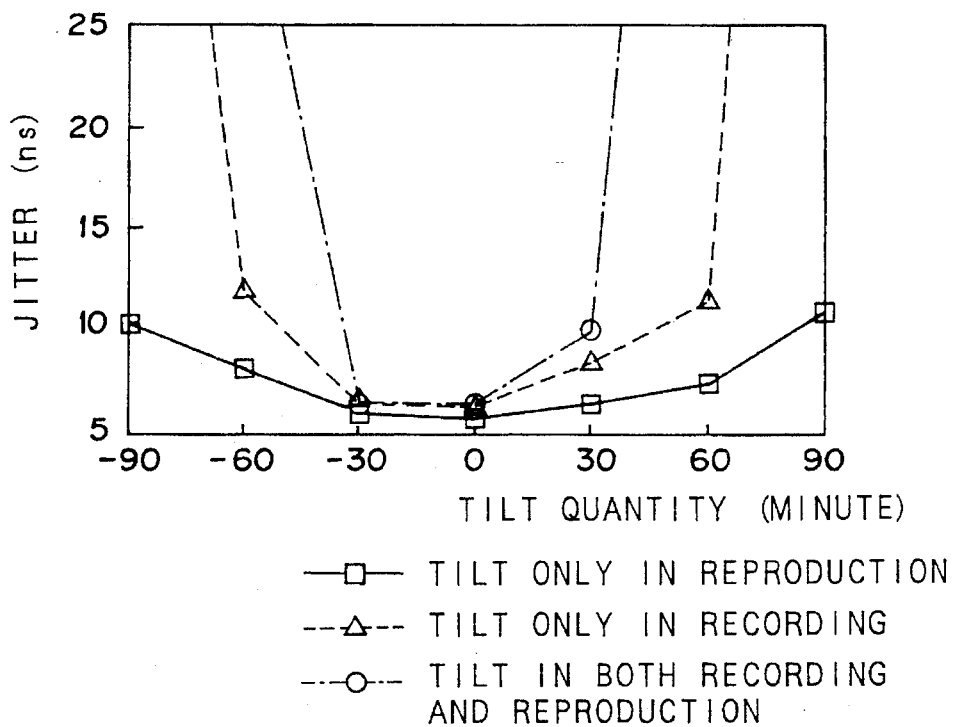
FIG. 1B is a diagram illustrating a relation between disk tilt quantity and jitter.
Figure 2B:
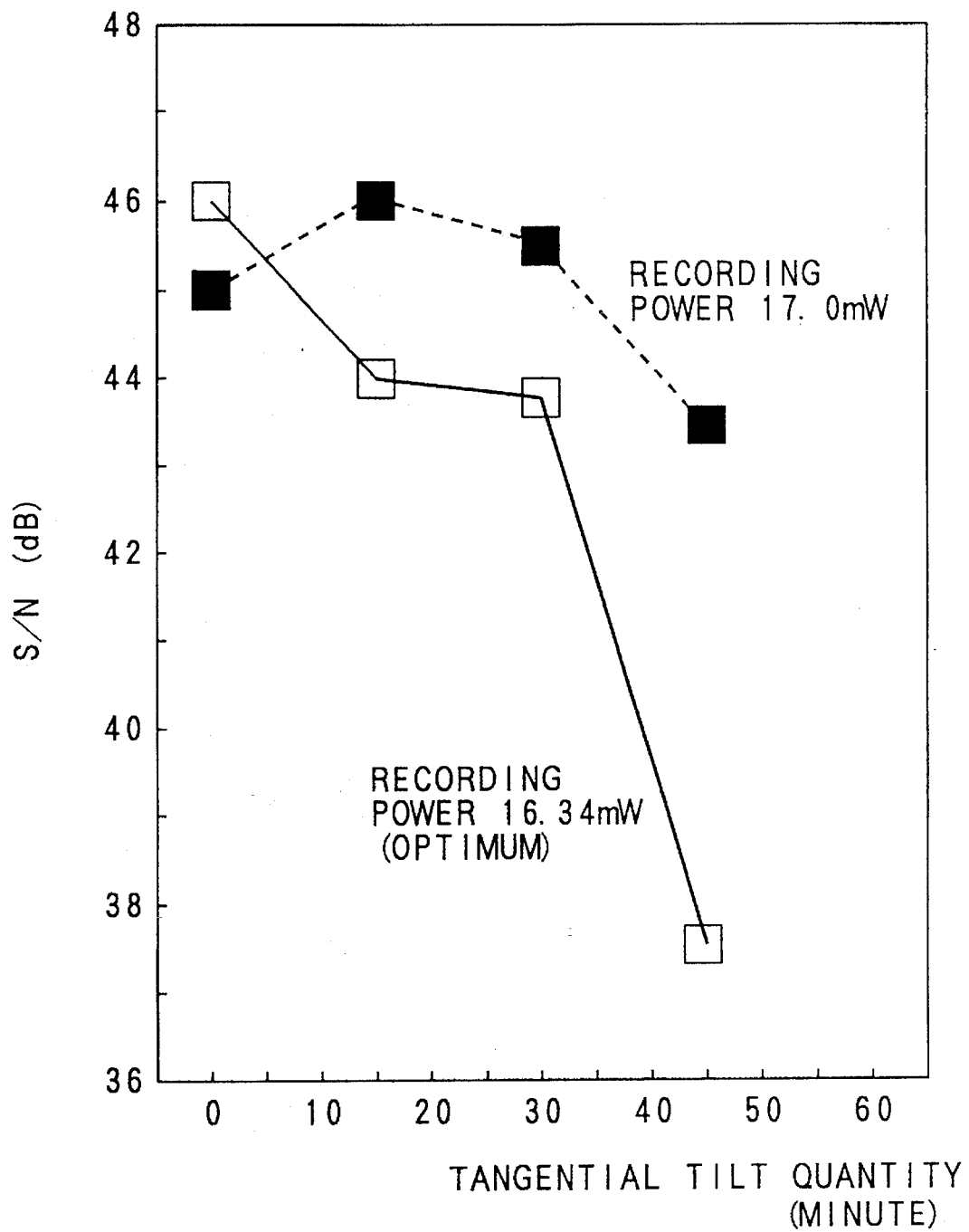
FIG. 2B is a diagram illustrating a relation between disk tilt and S/N ratio.
Figure 3A:
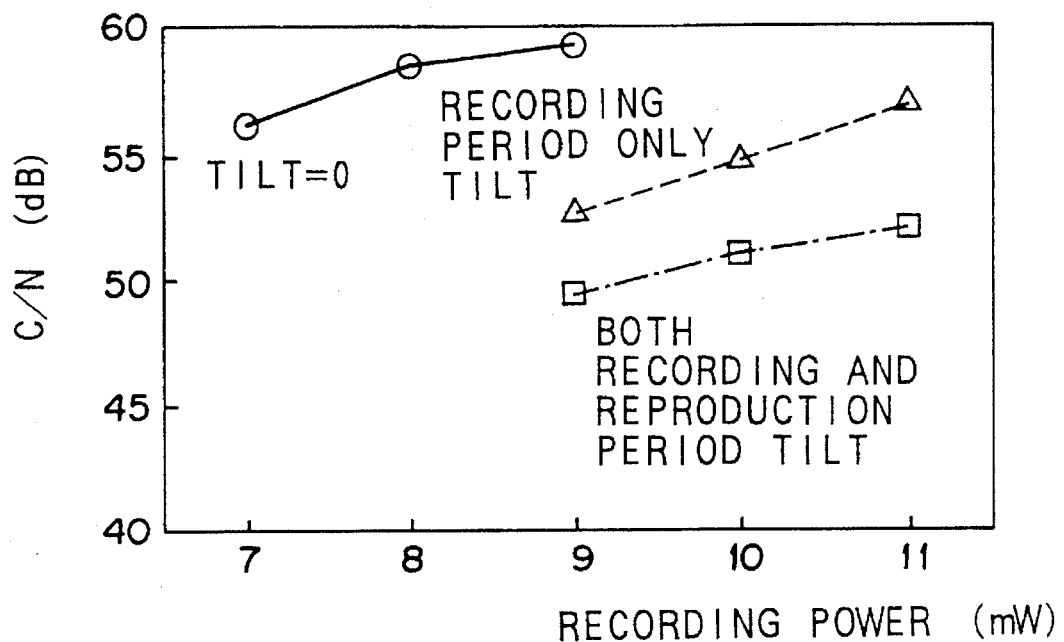
FIG. 3A is a diagram illustrating a relation between recording power and C/N ratio.
Figure 3B:
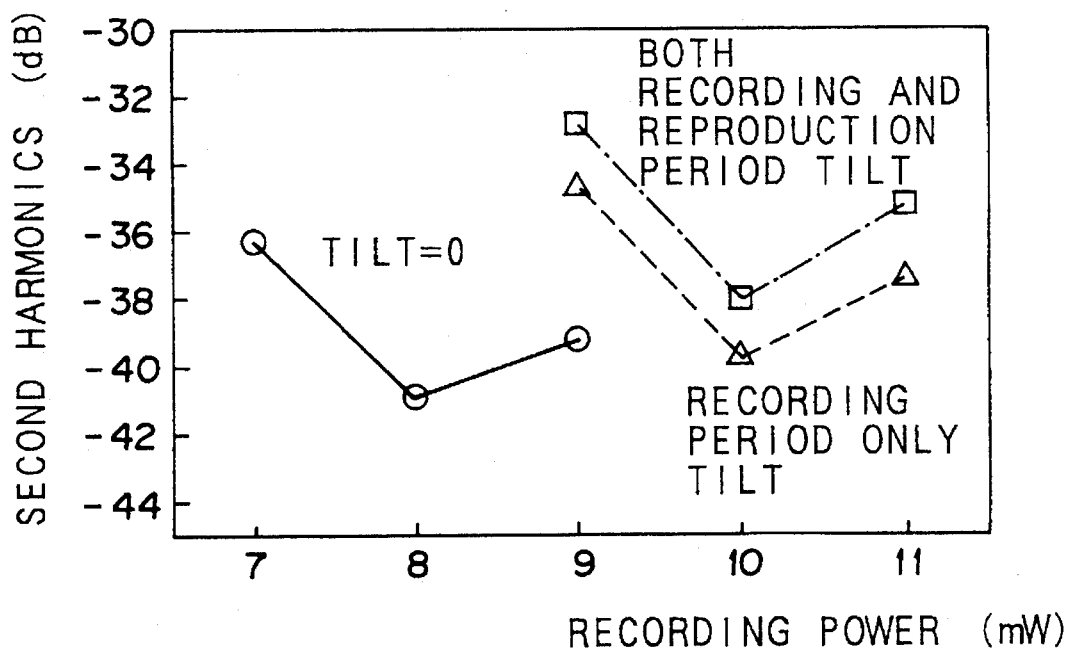
FIG. 3B is a diagram illustrating a relation between recording power and second harmonics.

FIG. 1A illustrates a relation between disk tilt quantity and C/N (Carrier to Noise) ratio, and FIG. 1B illustrates a relation between disk tilt quantity and jitter. FIGS. 1A and 1B refer to three cases where disk is tilted only in reproduction, where disk is tilted only in recording, and where disk is tilted in both recording and reproduction. In addition, FIG. 2A illustrates a relation between recording power and S/N (Signal to Noise) ratio, FIG. 2B illustrates a relation between tangential tilt and S/N ratio, FIG. 3A illustrates a relation between recording power and C/N ratio, FIG. 3B illustrates a relation between recording power and second harmonics, and FIG. 4 illustrates a relation between disk tilt quantity and second harmonics.

When disk is tilted, coma-aberration is produced. Additionally, when disk is tilted, peak value of a laser power is reduced due to an aberration and beam spot of the laser beam is enlarged. Therefore, in response to increase of disk tilt quantity, C/N ratio is deteriorated and jitter is increased. FIGS. 1A and 1B illustrate this phenomenon.. Namely, as seen from FIGS. 1A and 1B, if disk tilt quantity is equal level, deterioration of C/N ratio in the case where disk is tilted only in recording is approximately twice greater than that in the case where disk is tilted only in reproduction, and jitter level in the case where disk is tilted only in recording is approximately twice greater than that in the case where disk is tilted only in reproduction. That is, disk tilt should be corrected at the time of recording with an accuracy approximately twice higher than the correction accuracy at the time of reproduction. Therefore, it is necessary to increase recording power so as to compensate for deterioration of peak value of laser power and enlargement of laser beam spot due to the disk tilt so that tilt component is precisely corrected. Namely, enhancement of recording power improves C/N ratio to a certain extent and improves quality of information pit even when disk tilt exists. In addition, if recording power is determined slightly higher than the optimum value, that is, a margin power is added to the optimum recording power, S/N ratio of the reproduced signal is stabilized. This is illustrated in FIG. 2B which shows relation of tangential tilt quantity and S/N ratio in cases where the recording is conducted by the optimum recording power (16.34 mW) and a recording power (17.00 mW) approximately 1 mW higher than the optimum recording power. As apparent from FIG. 2B, if actual recording power is decided to be slightly higher than the optimum recording power, deterioration of S/N ratio can be avoided to a certain extent, and this is especially effective when the tilt quantity is large. Therefore, if a margin power is added to the optimum recording power when the tilt quantity is larger than a predetermined value, S/N ratio of the reproduced signal is stabilized.

Figure 4:
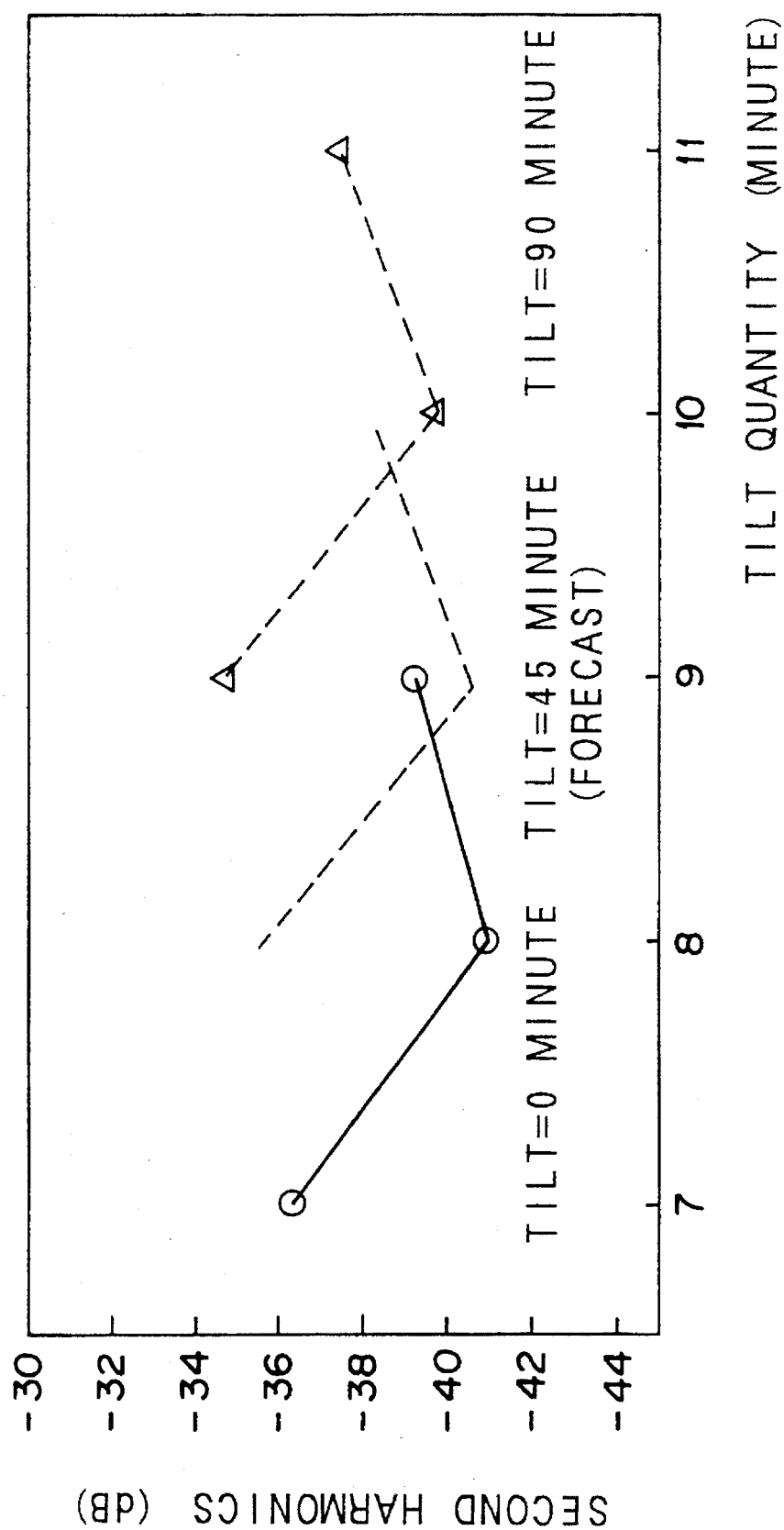
FIG. 4 is a diagram illustrating a relation between disk tilt quantity and second harmonics.

Further, in consideration of the interrelation of recording power and C/N ratio, second harmonics, etc., optimum recording power can be forecasted referring to disk tilt quantity, as shown in FIG. 4. Accordingly, if recording power is adjusted in consideration of quantity of disk tilt, information pit of high quality can be formed.

FIG. 4 illustrates the relation between recording power and disk tilt quantity using second harmonics as a parameter, however, it is possible to examine and evaluate quality of information pit or recording accuracy by using other parameters such as C/N ratio, jitter, etc. Actually, it is quite important how the parameter is decided, which is used to evaluate pit quality and recording accuracy and according to which recording power is adjusted. In this view, it is preferable and effective to use second harmonics as the parameter for adjusting recording power. This is because the second harmonics is an important parameter used not only in digital recording but in an analog FM modulation applied to Laser Disk, and being minimum second harmonics means that a waveform of reproduced signal has a duty ratio of 50%. This will be described more specifically. Namely, if the duty ratio of reproduced signal is satisfactory, recorded information is correctly reproduced even when reproduction C/N ratio of unit frequency is deteriorated to some degrees. However, if duty ratio of reproduced signal becomes unsatisfactory in Laser Disk system which uses frequency divided and analog FM modulation recording system, erroneous spectrum is produced in the spectrum of the reproduced signal. This results in cross modulation, deterioration of S/N ratio of reproduced signal, crosstalk and intermodulation. Further, in a digital recording system, when duty ratio of reproduced signal is deteriorated, eye pattern of the reproduced signal is deformed so that the reproduced signal can not correctly be read out. In view of this, duty ratio of the reproduced is a very important evaluation parameter for an improvement of recording accuracy, and it is quite effective to control recording power so that the duty ratio of the reproduced signal becomes optimum.

The novel feature of the optical information recording/reproducing device according to the present invention is that information is recorded in consideration of not only disk tilt of radial direction of the Optical disk (hereinafter referred to as "radial tilt") but also disk tilt of tangential direction of the optical disk (hereinafter referred to as "tangential tilt"). For correcting radial tilt, it is known a servo control method of detecting radial tilt and moving a rail supporting a pickup up and down or incline the same on the basis of the detected disk tilt so that the disk tilt quantity approaches to zero. However, in practice, optical disks used for recording may have disk tilt such as curvature or distortion not only in radial direction but in tangential direction, like the shape of "potato chips". In this case, it is conceivable to provide tilt correction mechanism in both radial and tangential direction and to perform two-dimensional servo control. However, such a measure requires quite complicated configuration and is not realizable in view of manufacturing cost and demand of miniaturizing device. For this reason, in the present invention, radial tilt is corrected by the correction mechanism described above while tangential tilt is corrected by controlling power of laser beam, thereby performing an accurate information recording. It is noted that following description will be directed to a control in a recording operation, it is nevertheless possible to perform the same control in a reproducing operation.

[II] 1st Embodiment

A first embodiment of the present invention will be described below with reference to the accompanying drawings.

Figure 5:
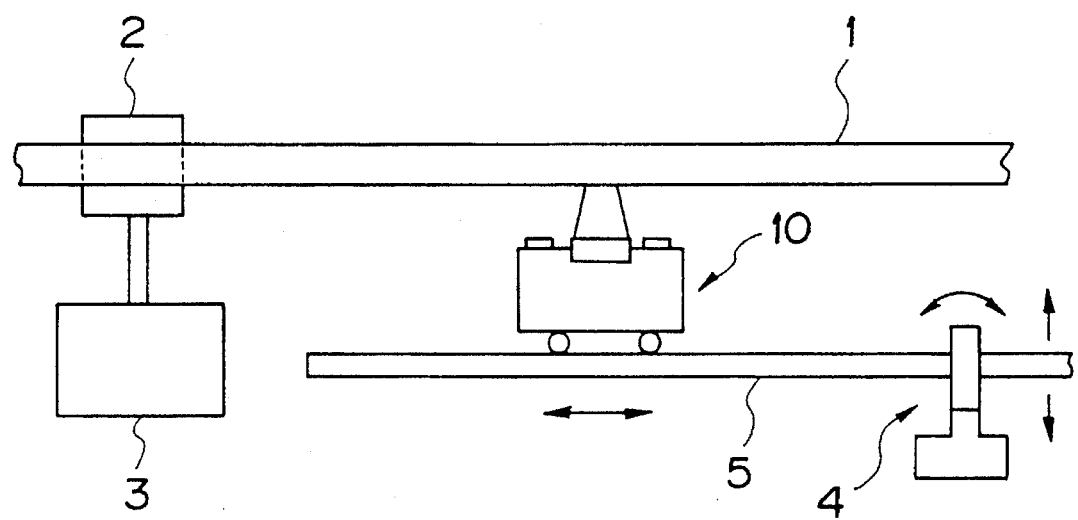
FIG. 5 is a diagram illustrating a construction of optical information recording device according to the present invention.

FIG. 5 shows a construction of an optical information recording device according to the present invention. As seen from FIG. 5, an optical disk 1 is fastened to a clamper 2 and is rotated by a spindle motor 3. A pickup 10 irradiates a laser beam on the recording surface of the optical disk 1 to record information thereon. The pickup 10 is supported by a rail 5 movably in a radial direction of the optical disk 1 (hereinafter simply referred to as "radial direction"). The rail 5 is moved up and down by a radial tilt mechanism for a quantity corresponding to a detected radial tilt quantity so that the rail 5 is inclined and the disk tilt in the radial direction is corrected.

Figure 6A:
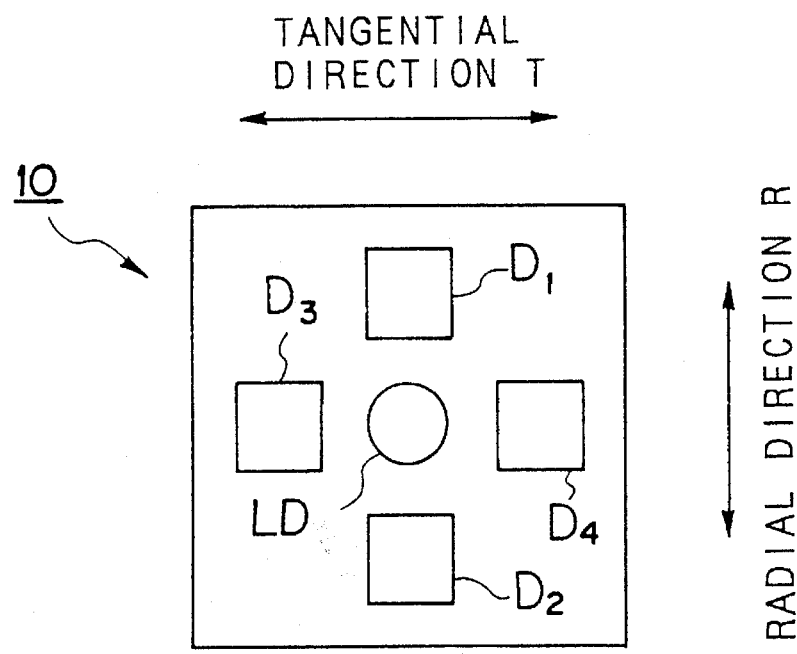
FIG. 6A is a diagram illustrating construction of tilt detecting unit.
Figure 6B:
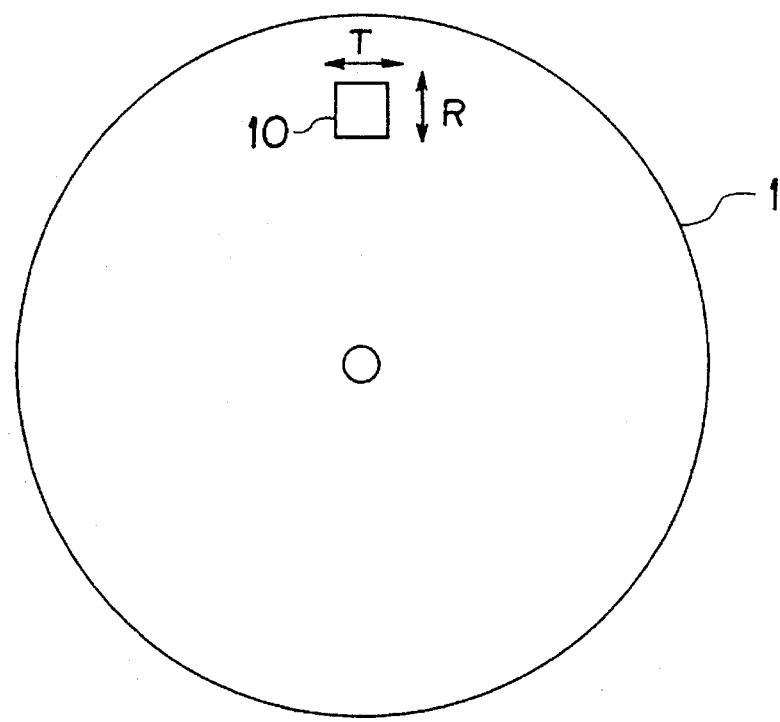
FIG. 6B is a diagram illustrating positional relation between pickup and optical disk.
Figure 7:
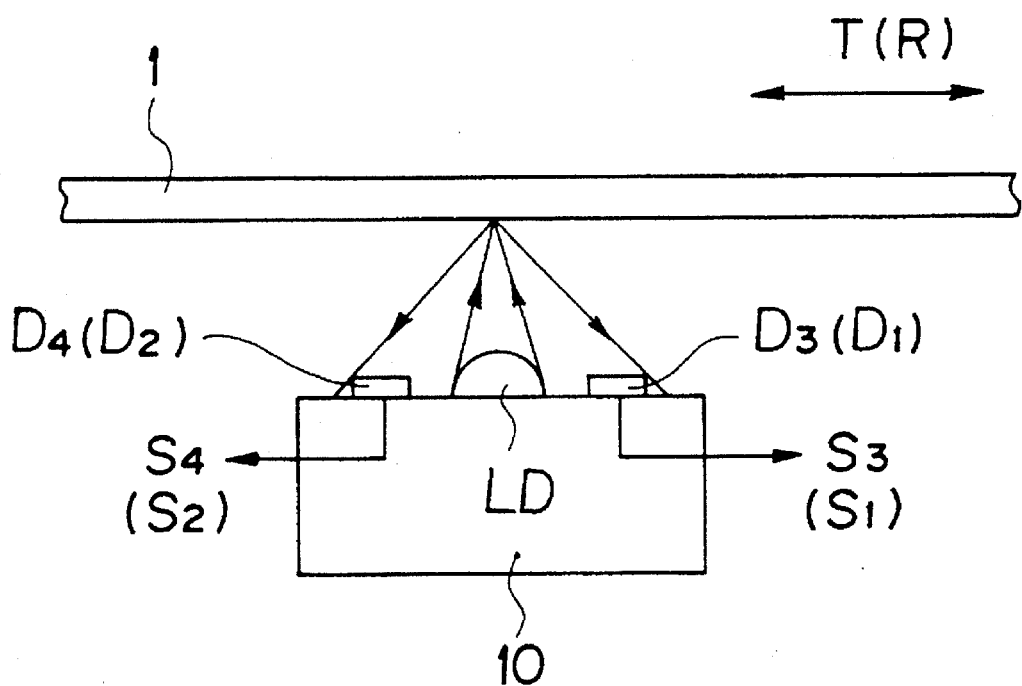
FIG. 7 is an explanatory diagram illustrating an operation of tilt detection.
Figure 8A:
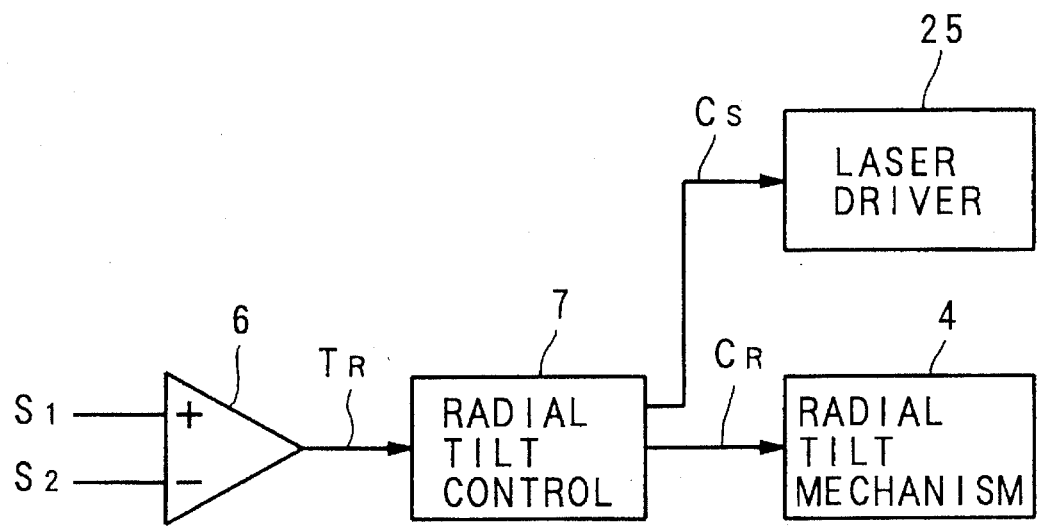
FIGS. 8A and 8B are block diagrams illustrating construction of tilt control unit.
Figure 8B:
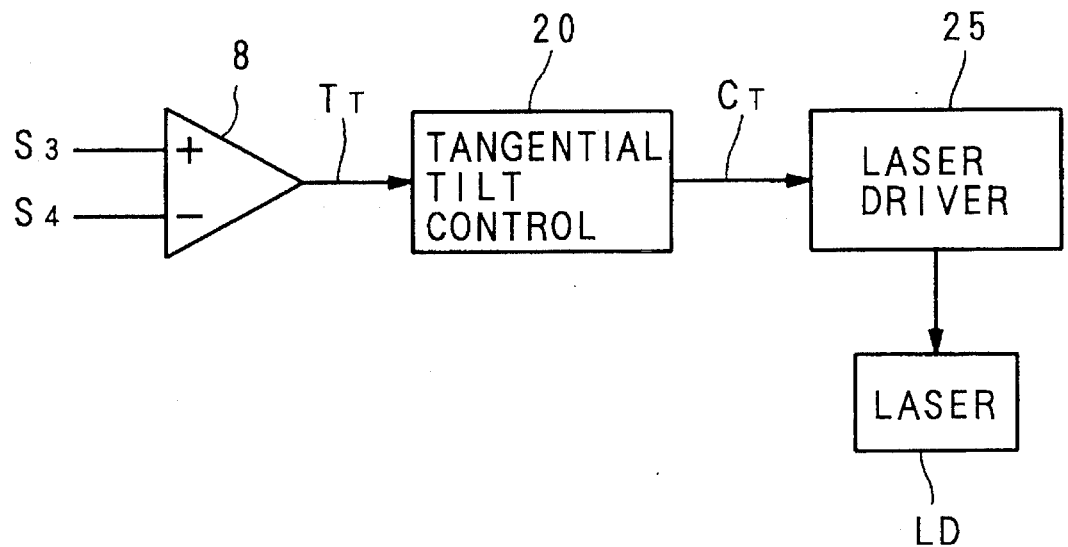

FIG. 6A illustrates a construction of a tilt detecting unit provided in the pickup 10, and FIG. 6B illustrate a positional relation of the pickup 10 and the optical disk 1. FIG. 7 illustrates an operation of tilt detection, and FIGS. 8A and 8B illustrate construction of a tilt control unit. As shown in FIG. 6A, the pickup 10 is provided with four photodetectors $D_1$ to $D_4$ in a fashion sandwiching a laser diode LD in both radial and tangential directions of the optical disk. As shown in FIG. 7, the photodetectors $D_1$ to $D_4$ receive the laser beam reflected by the surface of the optical disk 1 and perform optical-electric conversion to produce detection signals $S_1$–$S_4$ proportional to the quantity of the laser light received, respectively.

Firstly, an operation of radial tilt correction will be described. As shown in FIG. 8A, the detection signals $S_1$ and $S_2$ are supplied to differential amplifier 6 to output a radial tilt signal $T_R$. A radial tilt controller 7 performs an appropriate operation onto the radial tilt signal $T_R$, and supplies a radial control signal $C_R$ to the radial tilt mechanism shown in FIG. 5. The radial tilt mechanism 4 moves the rail 5 to correct the radial tilt so that the laser beam is irradiated accurately on the surface of the optical disk 1. On the other hand, the detection signals $S_3$ and $S_4$ are supplied to a differential amplifier 8, as shown in FIG. 8(B). The differential amplifier 8 outputs a tangential tilt signal $T_T$. A tangential tilt controller 20 produces a tangential control signal $C_T$ based on the tangential tilt signal $T_T$, and supplies it to a laser driver 25. The laser driver 25 activate the laser diode LD to emit a laser beam and irradiates the laser beam onto the surface of the optical disk 1. In addition, the radial tilt controller 7 detects a component of the radial tilt whose frequency is too high to be corrected by the radial tilt mechanism 4 and supplies it to the laser driver 25 as a control signal $C_s$. The laser driver 25 adjusts the power of the laser diode LD on the basis of the control signal $C_s$ so that such a high frequency component of the radial tilt is effectively corrected.

Figure 9:
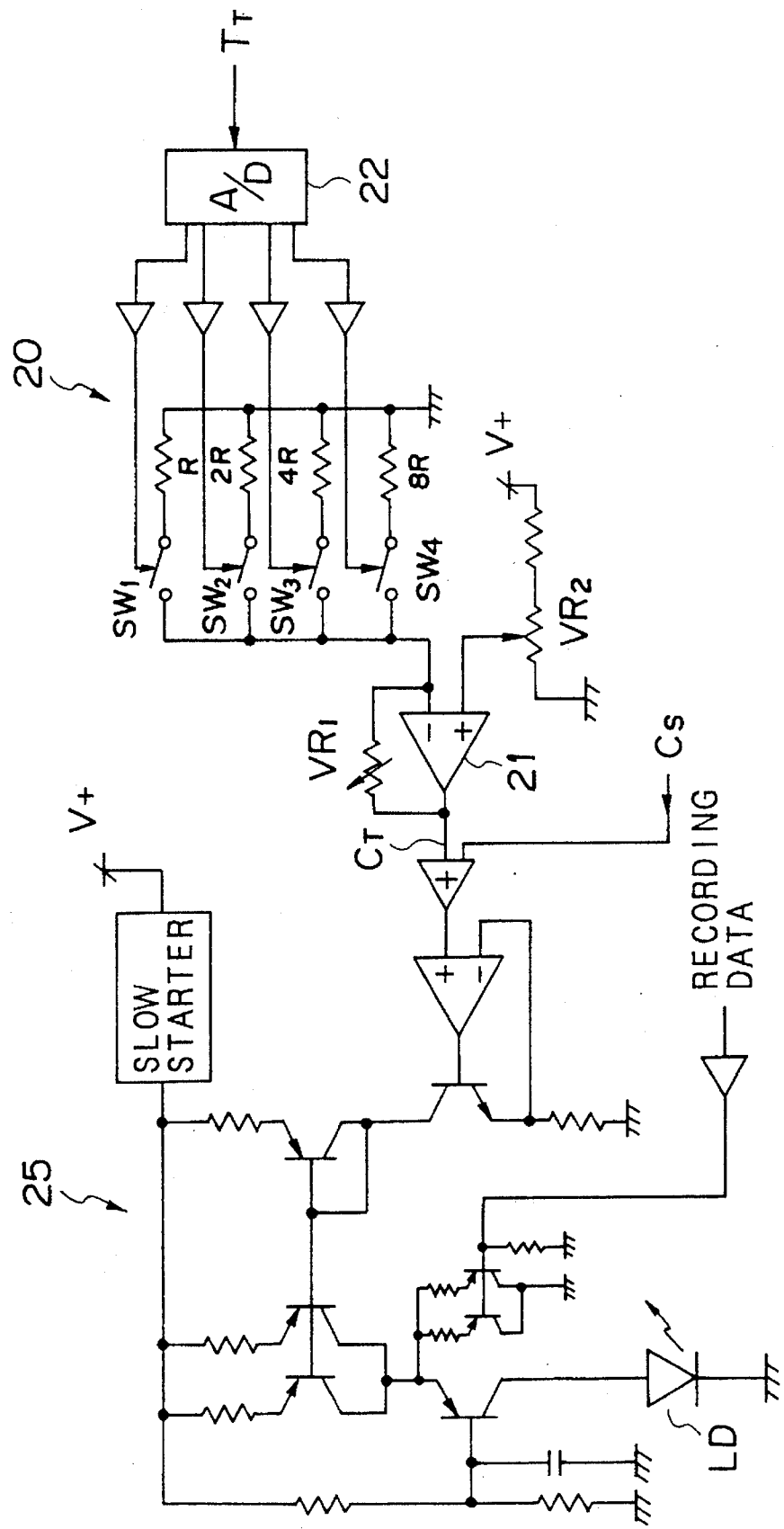
FIG. 9 is a diagram illustrating construction of tangential tilt controller and laser driver.

Next, an operation of tangential tilt correction will be described with reference to FIG. 9. In FIG. 9, an A/D converter 22 converts the tangential tilt signal $T_T$ to a digital value. Switches $SW_1$–$SW_4$ are turned ON and OFF in accordance with each of the bit data of the digitized value of the tangential tilt signal $T_T$, respectively, and hence D.C. voltage corresponding to the tangential tilt signal $T_T$ is applied to an inverted input terminal of the differential amplifier 21. Resistance value of variable resistors $VR_1$ and $VR_2$ are determined according to the relation of recording power and disk tilt quantity obtained using second harmonics as a parameter as seen in FIG. 4, for example, and a tangential control voltage $C_T$ corresponding to the disk tilt is output from the differential amplifier 21. The laser driver 25 receives the tangential control voltage $C_T$ and activates the laser diode LD by the power corresponding to the control voltage of the tangential control voltage $C_T$ to record recording data on the surface of the disk.

As described above, tilt component in tangential direction of the disk is corrected by adjusting the power of the laser. Therefore, information pits are accurately formed even when disk tilt in the tangential direction of the disk exists. Further, a high frequency component of the radial tilt which is unable to be corrected by the radial tilt mechanism can be corrected by supplying the control signal $C_s$ to the laser driver 25 and controlling the laser power.

Figure 10:
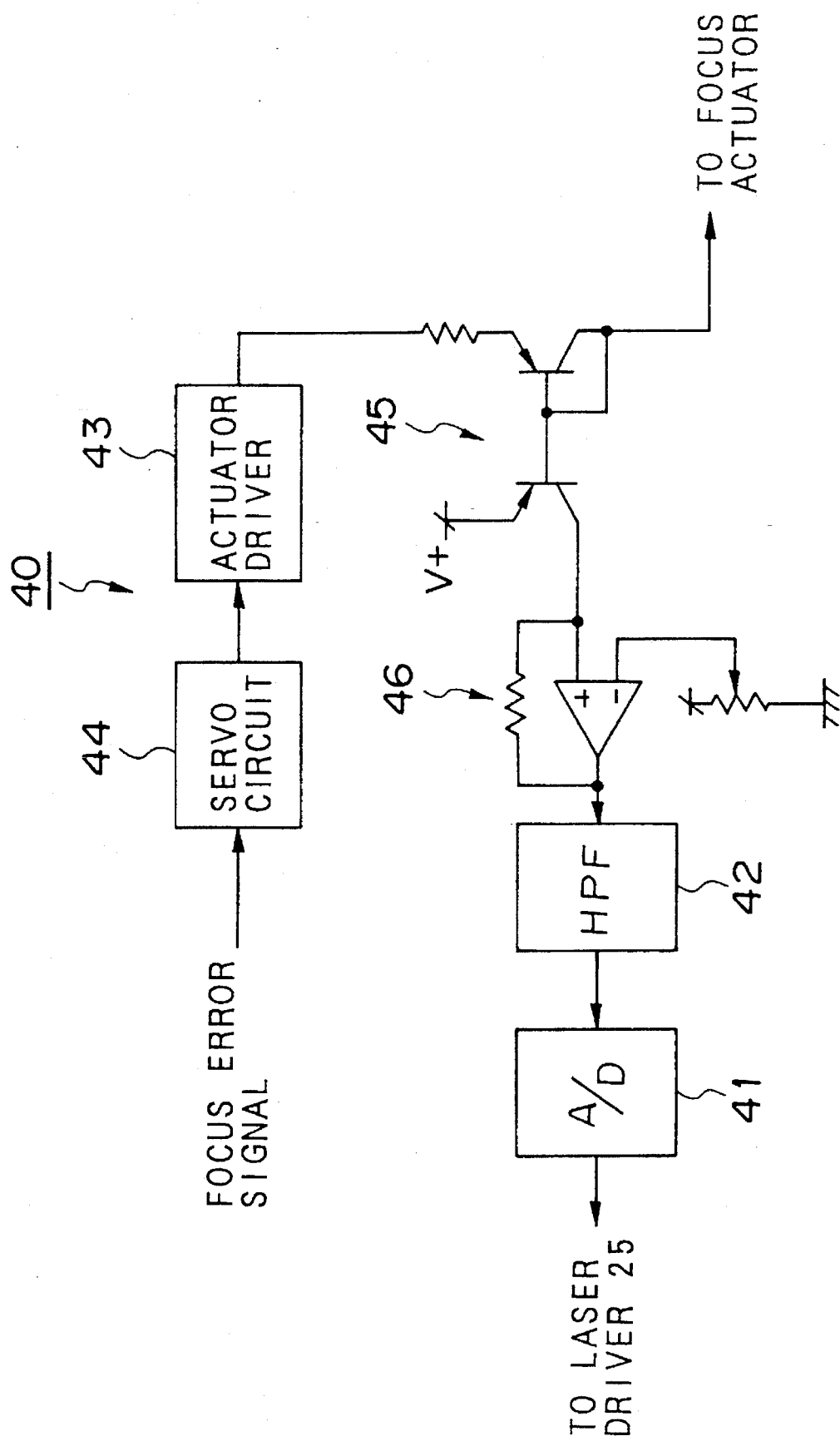
FIG. 10 is a diagram illustrating construction of another tilt detection unit.
Figure 11:
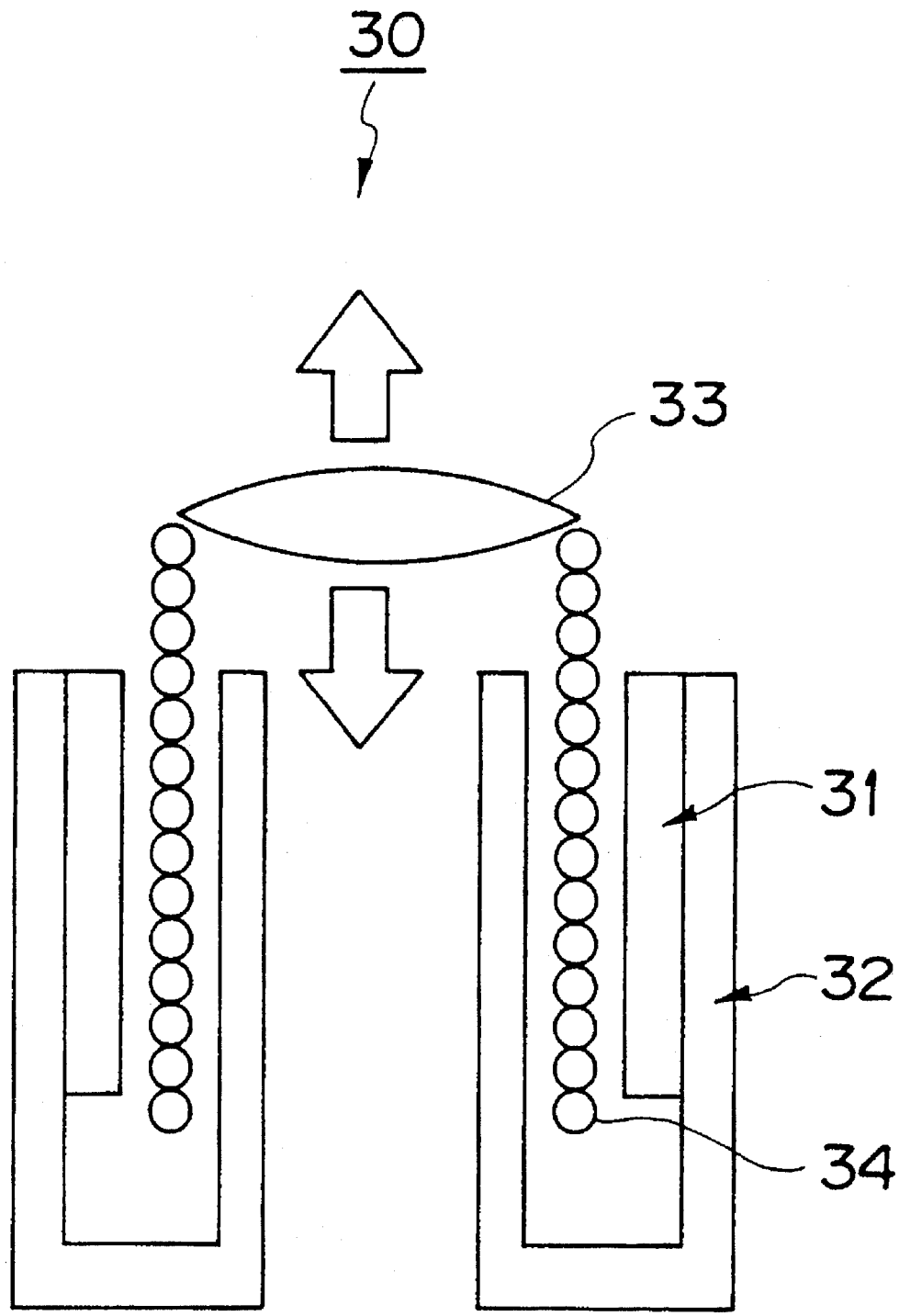
FIG. 11 is a diagram illustrating construction of focus actuator.
Figure 12:
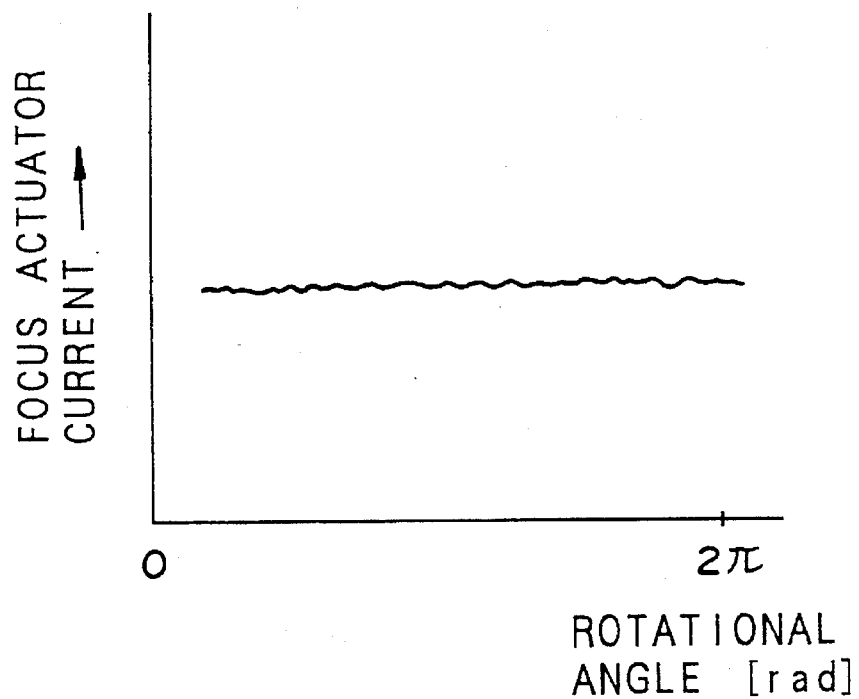
FIGS. 12A and 12B are diagrams illustrating relations between rotational angle of disk and focus actuator current.
Figure 12:
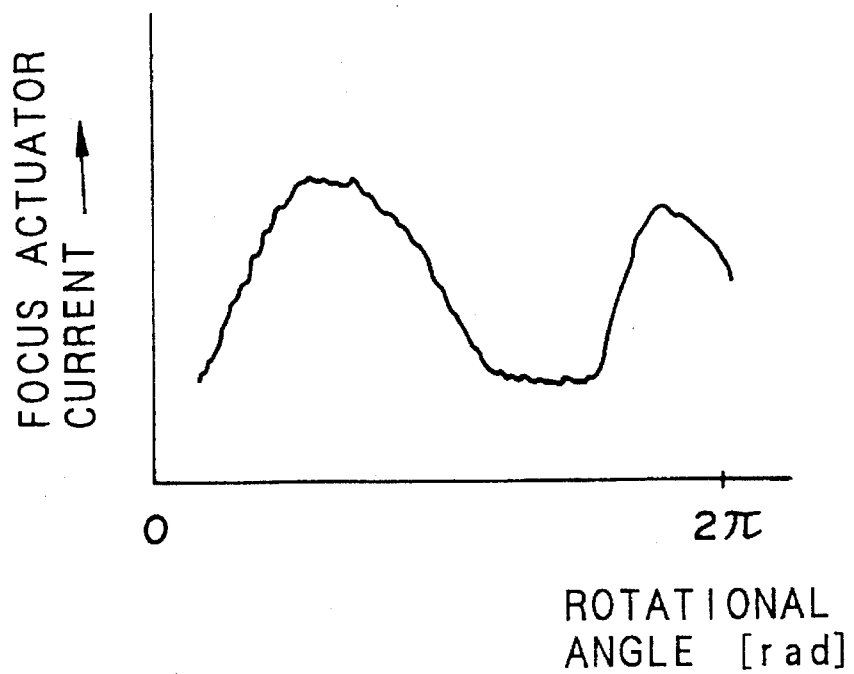

Next, tilt detection method utilizing current value flowing thorough an focus actuator will be described, as another example of tilt detection, with reference to FIGS. 10 to 12. As illustrated in FIG. 11, a focus actuator 30 includes a magnet 31, a magnetic circuit 32, a lens 33 and actuator coils 34. The magnet 31 and the magnetic circuit 32 produce a magnetic field. The lens 33 is moved up and down by controlling current flowing through the actuator coils 34, supporting the lens 33, within the magnetic field produced. Accordingly, current value flowing through the actuator coil 34 represents the position of the lens 33. Since distance between the optical disk 1 and the lens 33 kept to be a constant focus distance, the position of the lens is usable as information representing tilt quantity of the optical disk 1. Namely, as shown in FIG. 12A, when no disk tilt exists, the current flowing through the actuator coil is kept constant. However, when disk tilt exists, the current flowing through the actuator coil periodically varies in synchronism with the rotation of the optical disk, as shown in FIG. 12B. Therefore, current flowing through the focus actuator within a focus servo circuit is extracted therefrom using a current mirror circuit 45 and utilized as a disk tilt signal. More specifically, the current flowing through the focus actuator is converted to a voltage by a circuit 46, and the voltage is converted to a digital value after filtered by a High-Pass Filter 42. Then, the digital value is applied to the laser driver 25. The reason for providing the HPF 42 is as follows. In the subject system, tilt servo operation in radial direction is performed simultaneous with the tangential servo control. Therefore, when the curvature of the optical disk is gradually increasing from the inner portion to the outer portion thereof, the detected current value varies at very low frequency. Therefore, the HPF 42 is provided to remove this low frequency variation of the detected current. In FIG. 10, since the output of the HPF 42 is an A.C. component, the output of the HPF 42 is digitized using a point of A.C. zero volt as a reference point or the magnitude of the output of the HPF 42 is digitized. The output of the A/D converter 41 is applied to the laser driver 25.

Figure 13:
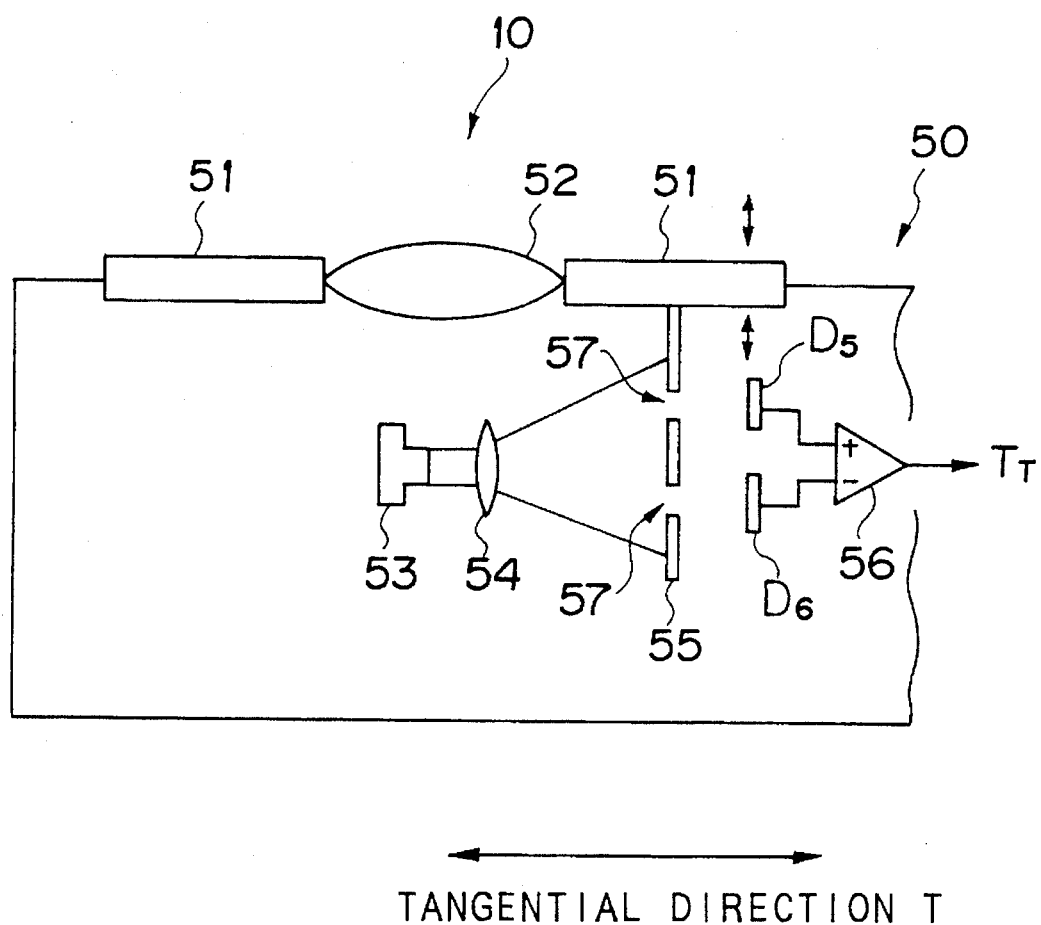
FIG. 13 is a diagram illustrating construction of still another tilt detection unit.

FIG. 13 illustrates still another method of detecting tilt component. According to this tilt detection, the pickup is provided with a laser 53, a collimator lens 54, a shielding board 55, photodetectors $D_5$ and $D_6$, and a differential amplifier 56. An objective lens 52 is supported by spring elements 51. Laser beam emitted from the laser 53 is irradiated on the surface of the shielding board 55. The shielding board 55 is provided with pinholes 57 and hence the laser beam passes through the pinholes 57 to be incident upon the photodetectors $D_5$ and $D_6$. The shielding board 55 is interlocked with the spring elements 51. Therefore, if the position of the shielding board 55 is adjusted so that the difference of the outputs from the photodetectors $D_5$ and $D_6$ becomes zero at a reference point, the difference of the outputs of the photodetectors $D_5$ and $D_6$ is usable as a tangential tilt quantity $T_T$. It is noted that the number of the pinholes, photodetectors are arbitrarily decided in consideration of detection accuracy required to the system.

[III] 2nd Embodiment

Next, the second embodiment of the present invention will be described with reference to FIGS. 14 and 15. The novel feature of this embodiment is that the power of the laser beam is controlled in accordance with an absolute value (scholar value) of the tilt component which is calculated from radial tilt and tangential tilt.

Figure 14:
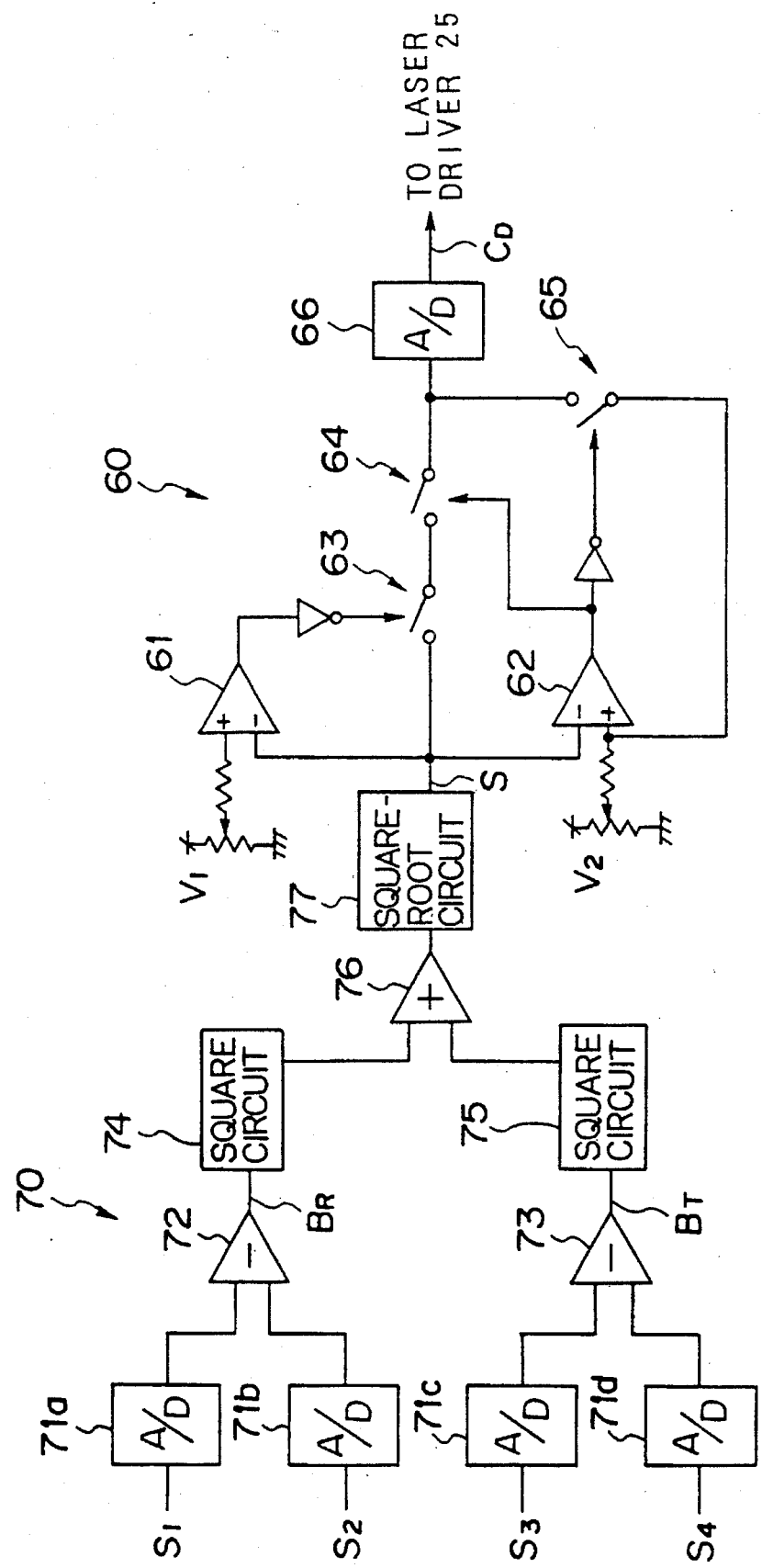
FIG. 14 is a diagram illustrating construction of tilt controller according to the second embodiment of the present invention.
Figure 15:
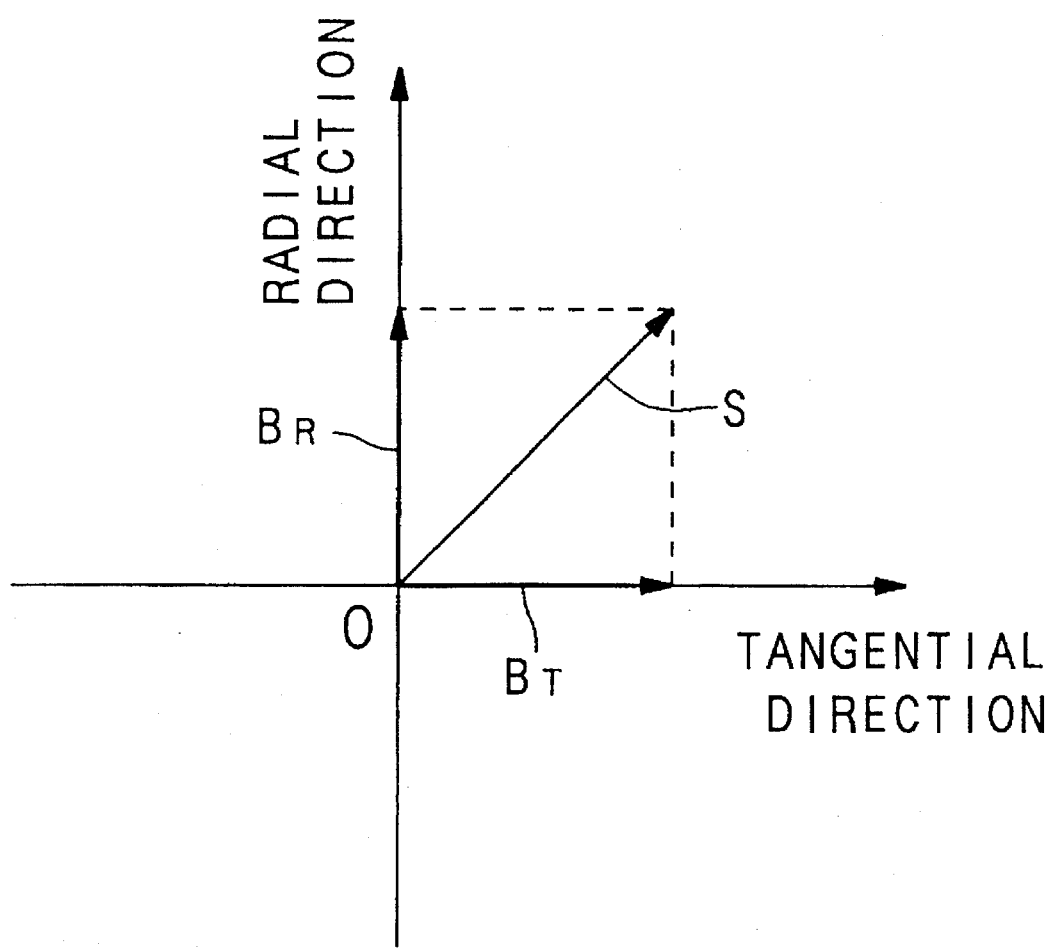
FIG. 15 is a diagram illustrating a scholar signal.

FIG. 14 illustrates a tilt correction unit according to the second embodiment of the invention. The tilt correction unit roughly includes a vector-scholar conversion unit 70 and a limiter unit 60. The vector-scholar conversion unit 70 includes four A/D converters 71a–71d, subtracters 72 and 73, square circuits 74 and 75, an adder 76 and a square-root circuit 77. The limiter unit 60 includes comparators 61 and 62, switches 63–65 and an A/D converter 66. To the A/D converters 71a–71d are supplied, respectively, the detection signals $S_1$–$S_4$ detected by the tilt detection unit shown in FIG. 6. The detection signals $S_1$–$S_4$ are digitized by the A/D converters 71a–71d and supplied to the subtracters 72 and 73. The subtracter 72 outputs a difference $B_R$ between the input signals $S_1$ and $S_2$. Since the detection signals $S_1$ and $S_2$ are output signals of the photodetectors $D_1$ and $D_2$ arranged in the radial direction of the disk, as shown in FIG. 6, the output $B_R$ from the subtracter 72 is a signal representing a tilt vector in the radial direction. Similarly, the output $B_T$ from the subtracter 73 is a signal representing a tilt vector in the tangential direction. These are vector signals having directions as illustrated in FIG. 15, respectively. Square values of the vector signals $B_R$ and $B_T$ are calculated in square circuits 74 and 75, and the adder 76 and square-root circuit 77 produce a scholar signal S from the outputs of the square circuits 74 and 75. The scholar signal S represents a scholar value shown in FIG. 15 and is supplied to the limiter unit 60.

The limiter unit 60 has a function to supply a control signal $C_D$ corresponding to the scholar signal S to the laser driver 25. In the limiter unit 60, the voltage $V_1$ is decided to correspond to a disk tilt quantity of 5 minutes while the voltage $V_2$ is decided to correspond to a disk tilt quantity of 60 minutes. The comparators 61 and 63 compares the scholar signal S with the voltages $V_1$ and $V_2$, respectively, and the switches 63–65 are changed-over in response to the results of the comparison. Specifically, when the scholar signal S indicates a disk tilt quantity smaller than 5 minutes, all of the switches 63–65 are turned OFF and laser driver controls the laser diode to emit a laser beam of normal power to record information. When the scholar signal S indicates a disk tilt quantity larger than 5 minutes and smaller than 60 minutes, the switches 63 and 64 are turned ON while the switch 65 is turned OFF. Therefore, a control signal $C_D$ corresponding to the scholar signal S is supplied to the laser driver 25. When the scholar signal S indicates a disk tilt quantity larger than 60 minutes, only the switch 65 is turned ON, and therefore a control signal $C_D$ corresponding to a disk tilt quantity of 60 minutes is supplied to the laser driver 25.

As described above, according to the second embodiment, the radial and tangential tilt are represented by a scholar value and recording laser power is controlled in accordance with the scholar value. Therefore, it is possible to effectively correct tilt of high frequency component which can hardly corrected by a tilt correcting mechanism. Further, since the disk is not moved up and down, there is no possibility of injuring or destroying disk when relatively big error is taken place in the tilt detection. Still further, since the disk tilt is detected as a scholar value, accurate correction can be performed irrespective of the direction of the disk tilt.

In the above description, upper limit and lower limit of the limiter unit is decided to 5 minutes and 60 minutes, respectively. However, these values are arbitrarily alterable in accordance with the characteristics of disks used. In addition, the construction of the limiter unit is not limited to the above descried feature and various constructions controlling recording laser power in accordance with scholar value of tilt component are within a range of the present invention.

As described above, according to one aspect of the present invention, tilt component of the radial direction is corrected by a tilt mechanism for moving the pickup up and down while tilt component of tangential direction is corrected by controlling a recording laser power. Therefore, it is possible to accurately form information pits onto a complicatedly deformed disk which has curvature or inclination in both radial and tangential direction thereof. In addition, according to another aspect of the present invention, tilt quantity is represented by a scholar value and the recording laser power is controlled in accordance with the scholar value. Therefore, it is possible to accurately correct tilt component of high frequency regardless of the direction of the disk tilt.

The invention may be embodied on other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning an range of equivalency of the claims are therefore intended to be embraced therein.

What is claimed is:

1. A device for recording information on a recordable optical disk comprising:

laser unit for emitting and irradiating a laser beam onto the optical disk;

tilt detecting unit for detecting a tilt quantity of the optical disk in a tangential direction thereof; and laser power control unit for controlling the power of the laser beam on the basis of the tilt quantity detected by the tilt detecting unit.

2. A device according to claim 1, wherein said laser power control unit controls the laser unit so that the power of the laser beam is increased when the tilt quantity is large.

3. A device according to claim 2, wherein said laser power control unit adds a margin power to the power of the laser beam when the tilt quantity exceeds a predetermined quantity.

4. A device according to claim 1, wherein said tilt detecting unit comprises: a plurality of photodetecting elements for receiving the laser beam reflected by the optical disk and producing electrical signal, respectively, and operation unit for comparing the electrical signals and calculating the tilt quantity, said photodetecting elements are arranged in the tangential direction of the optical disk.

5. A device according to claim 1, further comprising an optical pickup, and said tilt detecting unit detecting the tilt quantity on the basis of a current value flowing through an actuator coil provided in the optical pickup.

6. A device for recording information on a recordable optical disk comprising:

an optical pickup provided with laser unit for emitting and irradiating a laser beam onto the optical disk;

radial tilt detecting unit for detecting tilt quantity of the optical disk in a radial direction thereof;

tangential tilt detecting unit for detecting tilt quantity of the optical disk in a tangential direction thereof;

radial tilt correcting mechanism for moving the pickup on the basis of the radial tilt quantity to correct the radial tilt; and tangential tilt correcting unit for controlling the power of the laser beam on the basis of the tangential tilt quantity.

7. A device according to claim 6, wherein said tangential tilt correcting unit adds a margin power to the power of the laser beam when the tilt quantity exceeds a predetermined quantity.

8. A device according to claim 6, wherein said tangential tilt detecting unit comprises: a plurality of photodetecting elements for receiving the laser beam reflected by the optical disk and producing electrical signals, respectively, and operation unit for comparing the electrical signals and calculating the tangential tilt quantity, said photodetecting elements are arranged in the tangential direction of the optical disk.

9. A device according to claim 6, wherein said tangential tilt detecting unit detects the quantity of tangential tilt on the basis of a current value flowing through an actuator coil provided in the optical pickup.

10. A device according to claim 6, further comprising unit for detecting a quantity of high frequency component of the radial tilt and controlling the power of the laser beam on the basis of the quantity of high frequency component.

11. A device for recording information on a recordable optical disk comprising:

an optical pickup provided with laser for emitting and irradiating a laser beam onto the optical disk;

radial tilt detecting unit for detecting tilt quantity of the optical disk in a radial direction thereof;

tangential tilt detecting unit for detecting tilt quantity of the optical disk in a tangential direction thereof;

operation unit for calculating scholar value of tilt quantity on the basis of the quantity of radial tilt and the quantity of tangential tilt; and tilt correcting unit for controlling the power of the laser beam on the basis of the scholar value calculated.

12. A device according to claim 11, wherein said operation unit comprises: square circuits for calculating square values of the quantity of radial tilt and the quantity of tangential tilt, an adder for adding the square values calculated, and a square-root circuit for calculating a square-root of the added value to produce the scholar value of the tilt quantity.

13. A device according to claim 11, wherein said tilt correcting unit adds a margin power to the power of the laser beam when the tilt quantity exceeds a predetermined quantity.

* * * * *